March 29, 1932.  H. M. ELSEY  1,851,573
PROCESS OF CARBONIZING METALS
Filed Aug. 14, 1929
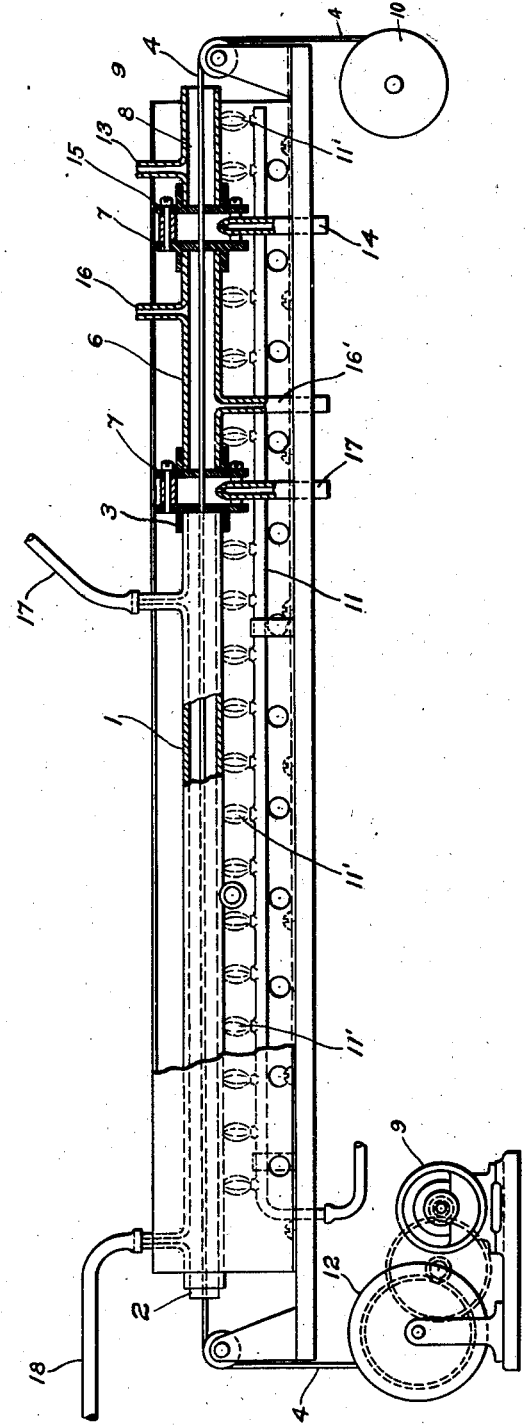
INVENTOR
Howard M. Elsey.
BY
ATTORNEY metal having a different coefficient of expansion so that the two act as a thermostat to automatically adjust the pressure of the brake shoe 32. In either case, the set screw is adjusted initially, and in the latter case in which a thermostat is used, the pressure is further controlled by the thermostat. The brake shoe presses directly against the periphery of the shaft 4 and although a lining or facing 33 is used, a metal to metal contact may be used. The pressure applied is very little but sufficient to restrain spinning of the gears.

In any embodiment of my invention, spinning of the gears is automatically restrained when the force tending to turn them is released as when the clutch pedal is thrown out so that gear shifting operations are performed without clashing of the gears.

In the form shown in Figures 1 and 5, the braking effect is controlled by thermostatic means, and in Figure 1, the thermostatic means is used in conjunction with the clutch pedal.

What I claim is:

1. The combination with an automobile change speed transmission gearing comprising a housing and the usual complement of shafts and shiftable gears in the housing, and the engine clutch including a shiftable clutch section connected to the drive shaft of the gearing and shiftable to disconnect the gearing from the engine and operable to disconnect the gearing from the engine preliminary to gear shifting operations, of a magnetic brake acting on a rotatable part of the gearing to restrain spinning of the rotatable parts of the gearing during gear shifting operations when the engine clutch is thrown out.

2. The combination with an automobile change speed transmission gearing comprising a housing and the usual complement of shafts and shiftable gears, and the engine clutch including a shiftable clutch section connected to the drive shaft of the gearing and shiftable to disconnect the gearing from the engine and operable to disconnect the gearing from the engine preliminary to gear shifting operations, of a brake acting on a rotatable part of the gearing to restrain spinning of the rotatable parts of the gearing during gear shifting operations when the engine clutch is thrown out, and means controlled by the temperature of the oil in the gear housing for controlling the application of the brake.

3. The combination with an automobile change speed transmission gearing comprising a housing and the usual complement of shafts and shiftable gears, and the engine clutch including a shiftable clutch section connected to the drive shaft of the gearing and shiftable to disconnect the gearing from the engine and operable to disconnect the gearing from the engine preliminary to gear shifting operations, of a brake acting on a rotatable part of the gearing to restrain the spinning of the rotatable parts of the gearing during gear shifting operations when the engine clutch is thrown out, and means including a thermostat subject to the temperature of the oil in the gear housing for controlling the application of the brake.

4. The combination with an automobile change speed transmission gearing comprising a housing and the usual complement of shafts and shiftable gears, and the engine clutch including a shiftable clutch section connected to the drive shaft of the gearing and shiftable to disconnect the gearing from the engine and operable to disconnect the gearing from the engine preliminary to gear shifting operations, of a brake acting on the rotatable part of the gearing to restrain spinning of the rotatable parts of the gearing during gear shifting operations when the engine clutch is thrown out, an electro magnetic brake acting on a rotatable part of the gearing, an electric circuit having a normally open switch therein operable into closed position by the throwing out of the clutch.

5. The combination with an automobile change speed transmission gearing comprising a housing and the usual complement of shafts and shiftable gears, and the engine clutch including a shiftable clutch section connected to the drive shaft of the gearing and shiftable to disconnect the gearing from the engine and operable to disconnect the gearing from the engine preliminary to gear shifting operations, of a brake acting on a rotatable part of the gearing to restrain spinning of the rotatable parts of the gearing during gear shifting operations when the engine clutch is thrown out, an electro-magnetic brake acting on the rotatable part of the gearing, an electric circuit having a normally open switch therein operable into closed position by the throwing out of the clutch, and a thermostatically operated circuit closer subject to the temperature of the oil in the gear housing for controlling the flow of current through said circuit when the first mentioned switch is closed.

6. The combination with an automobile change speed transmission gearing comprising a housing and the usual complement of shafts and shiftable gears, and the engine clutch including a shiftable clutch section connected to the drive shaft of the gearing and shiftable to disconnect the gearing from the engine and operable to disconnect the gearing from the engine preliminary to gear shifting operations, of a brake acting on a rotatable part of the gearing to restrain the spinning of the rotatable parts of the gearing during gear shifting operations when the engine clutch is thrown out, an electromagnetic brake acting on a rotatable part of the gear-

I desire, therefore, that only such limitations shall be placed upon my invention as are imposed by the prior art and the appended claims.

I claim as my invention:

1. The process of producing a uniformly carbonized metal which comprises oxidizing the metal, reducing the oxidized metal, and then exposing the oxidized metal to the action of a hydrocarbon gas at an elevated temperature.

2. The process of producing a uniformly carbonized metal which comprises oxidizing the metal, reducing the oxidized metal, and then exposing the reduced metal, at an elevated temperature, to a hydrocarbon gas that is substantially free from uncombined hydrogen.

3. The process of producing a uniformly carbonized nickel surface which comprises oxidizing a nickel wire or ribbon, reducing the oxidized surface, and then subjecting the reduced metal, at an elevated temperature, to the action of a hydrocarbon gas.

4. The process of producing uniformly carbonized nickel which comprises oxidizing the nickel, reducing the oxidized surface, and then subjecting the freshly reduced nickel, at an elevated temperature, to the action of a hydrocarbon gas for a sufficient length of time to uniformly carbonize the nickel.

5. The process of producing a uniformly carbonized alloy containing nickel as an essential ingredient which comprises oxidizing the metal, reducing the oxidized metal, placing the freshly reduced metal in a furnace, and passing a hydrocarbon gas through the furnace, the furnace being maintained at a sufficient temperature to cause the hydrocarbon gas to carbonize the metal.

6. The process of producing a uniformly carbonized metal which comprises oxidizing the metal, reducing the metal, placing the freshly reduced metal in a furnace, and passing a hydrocarbon gas through the furnace while maintaining the furnace at a sufficient temperature to carbonize the reduced metal.

7. The process of producing a uniformly carbonized metal which comprises oxidizing the metal, reducing the oxidized metal, and then placing the freshly reduced metal in a furnace and passing a hydrocarbon gas that is substantially free from uncombined hydrogen through the furnace, the furnace being maintained at a sufficient temperature to cause the hydrocarbon gas to decompose and permanently carbonize the metal.

8. The process of producing uniformly carbonized nickel which comprises oxidizing the nickel, reducing the oxidized nickel, placing the freshly reduced nickel in a furnace and passing casinghead gasoline mixed with acetylene through the furnace, the furnace being maintained at a sufficient temperature to cause the vapors of the casinghead gasoline and acetylene to form a carbonized metal.

9. The process of producing a uniformly carbonized metal which comprises oxidizing the metal, reducing the oxidized metal and placing the reduced metal in a furnace, and passing a hydrocarbon gas diluted with an inert gas through the furnace, the furnace being maintained at a sufficient temperature to carbonize the metal.

10. The process of continuously producing uniformly carbonized metallic wires or ribbons which comprises successively passing the wire or ribbon through an oxidizing chamber to oxidize the metal, through a reducing chamber to reduce the oxidized metal, and then through a carbonizing chamber filled with heated hydrocarbon gases to carbonize the freshly reduced metal.

In testimony whereof, I have hereunto subscribed my name this first day of August, 1929.

HOWARD M. ELSEY.